US011321717B2

(12) United States Patent
Kandasamy et al.

(10) Patent No.: US 11,321,717 B2
(45) Date of Patent: May 3, 2022

(54) SYSTEM AND METHOD FOR ANALYZING TRANSACTION NODES USING VISUAL ANALYTICS

(71) Applicant: VISA INTERNATIONAL SERVICE ASSOCIATION, San Francisco, CA (US)

(72) Inventors: Karthikeyan Kandasamy, Palo Alto, CA (US); Srinivasan Varadharajan, Palo Alto, CA (US); Hemant Deshpande, Palo Alto, CA (US); Prashant Trivedi, Palo Alto, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 182 days.

(21) Appl. No.: 16/428,353

(22) Filed: May 31, 2019

(65) Prior Publication Data
US 2019/0370812 A1 Dec. 5, 2019

Related U.S. Application Data

(60) Provisional application No. 62/678,813, filed on May 31, 2018.

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC .................................................. G06Q 20/4016

USPC .......................................................... 705/44
See application file for complete search history.

(56) References Cited

U.S. PATENT DOCUMENTS

| 10,460,320 B1* | 10/2019 | Cao ........................ G06N 20/10 |
| 10,567,402 B1* | 2/2020 | Comeaux .............. G06F 16/951 |
| 10,572,884 B1* | 2/2020 | Comeaux ............... G06N 20/00 |
| 10,812,503 B1* | 10/2020 | Comeaux ............ H04L 63/1433 |
| 10,834,104 B1* | 11/2020 | Comeaux .............. G06F 21/554 |
| 2014/0122340 A1* | 5/2014 | Flitcroft ................. G06Q 40/00 705/44 |

(Continued)

*Primary Examiner* — Mike Anderson
*Assistant Examiner* — Paul R Kloberg
(74) *Attorney, Agent, or Firm* — Loeb & Loeb LLP

(57) ABSTRACT

An account holder's portfolio of transactions may be represented as a network of interconnected transaction nodes where each node represents a credit card transaction. This network may then be analyzed using artificial intelligence and machine learning techniques coupled with visual representations of the interrelated nodes to draw conclusions. An account holder or other system entity may report a fraudulent transaction that employs the holder's account information. A backend system may organize transaction information as a network of data nodes that includes a variety of interrelated information. The backend system may then identify all financial transaction "nodes" within the network that are related or connected by common data. For example, multiple transactions may include a common merchant as the reported fraudulent transaction. The backend may then perform an analysis of the nodes to identify likely fraudulent transactions based on one or more of the data elements for each node.

19 Claims, 6 Drawing Sheets

(56) References Cited

U.S. PATENT DOCUMENTS

| | | | |
|---|---|---|---|
| 2015/0235223 A1* | 8/2015 | Meredith | H04W 4/029 |
| | | | 705/44 |
| 2018/0204111 A1* | 7/2018 | Zadeh | G06V 10/25 |
| 2019/0164164 A1* | 5/2019 | Karambakkam | G06N 5/043 |
| 2019/0236598 A1* | 8/2019 | Padmanabhan | G06N 3/08 |
| 2019/0340589 A1* | 11/2019 | Levy | G06N 3/08 |
| 2019/0342205 A1* | 11/2019 | Ur | H04L 45/34 |
| 2019/0379595 A1* | 12/2019 | Ur | G06N 3/04 |
| 2020/0184278 A1* | 6/2020 | Zadeh | G06K 9/6264 |

\* cited by examiner

SYSTEM AND METHOD FOR ANALYZING TRANSACTION NODES USING VISUAL ANALYTICS

CROSS-REFERENCE TO RELATED APPLICATIONS

This application is a non-provisional application of U.S. Provisional Application No. 62/678,813 entitled "SYSTEM AND METHOD FOR ANALYZING TRANSACTION NODES USING VISUAL ANALYTICS" filed May 31, 2018. The disclosure of the application referenced above is incorporated by reference herein in its entirety.

BACKGROUND

The "Four Party Model" describes the credit card business model consisting of card networks, issuing banks ("issuers"), cardholders or consumers, merchants, and acquirer. Virtually all electronic card payments are constructed on the back of the Four Party Model as it serves to keep the entire system working together. The consumer receives a payment card account from the issuer. The account could be a credit, debit, or prepaid type of account linked to a payment device. The account can operate via a number of different methods including the Internet, a physical card, or mobile devices.

A typical transaction occurs in three phases: authorization, clearing, and settlement. During authorization, a cardholder or consumer chooses goods and services they wish to purchase using the payment device linked to an issuer account. The merchant's acquirer bank receives the transaction from the merchant and contacts the card network (e.g., Diner's Club, Discover, etc.) to check card security features and sends the transaction to the cardholder's bank for approval. The issuer approves the transaction as well as the card network and replies to the merchant's bank. The merchant's bank sends approval to the merchant, and the cardholder completes the transaction and receives a receipt. During clearing, the merchant's bank sends a clearing message including the purchase information to the card network which validates the purchase information and sends the purchase information to the cardholder's bank. The clearing process reconciles the merchant's bank and cardholder's bank for the transaction. At settlement, the cardholder's bank sends payment to the card network, and the card network sends the payment to the merchant's bank. The merchants bank then pays the merchant, and the cardholder's bank bills the cardholder.

Over time, transactions build a portfolio for each account holder. Analysis of each account holder's portfolio is typically done by human interaction with voluminous data. As the amount of data increases, so does the likelihood of analysis errors when relying solely on human interaction with the data to draw conclusions. One area of analysis that is particularly important is fraud detection. Fraudulent transactions are costly for issuers that typically cover expenses associated with such transactions. Per year, fraudulent credit card transactions cost the industry nearly $200 billion dollars in the United States alone. Typical systems and methods for identifying and controlling credit card fraud involve human interaction with massive amounts of transaction data and visual identification of fraudulent transactions on a spreadsheet. As a result of human analysis, fraud determinations are fraught with error resulting in lost profit, time, and growing inefficiency.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present disclosure provides a technical solution to the technical problem of analyzing credit card account holder portfolios generally, and identifying and controlling fraudulent credit card transactions in particular. In some embodiments, an account holder's portfolio of transactions may be represented as a network of interconnected transaction nodes where each node represents a credit card transaction. This network may then be analyzed using artificial intelligence and machine learning techniques coupled with visual representations of the interrelated nodes to draw conclusions. For example, a customer may report what he or she thinks is a fraudulent transaction using his or her credit card information. A backend system may organize transaction information as a network of data nodes that includes a variety of information that may be interrelated by account number, merchant, card networks, issuing banks ("issuers"), cardholders or consumers, merchants, acquirer, or any other data common to all the transactions occurring within a payment network. The backend system may then identify all financial transaction "nodes" within the network that are related or connected by common data. For example, multiple transactions may include a common merchant as the reported fraudulent transaction. The backend may then perform an analysis of the nodes to identify likely fraudulent transactions based on one or more of the data elements for each node.

In some embodiments, the analysis includes artificial intelligence (AI) or machine learning (ML) methods to automatically identify similar transactions that are most likely to be fraudulent. The AI/ML methods may identify multiple combinations of data to identify fraudulent transactions and other characteristics of each set of nodes based, at least in part, on correlations between data elements of various nodes. Once identified, the backend system may cancel the transaction or refund the amount of the transaction to the consumer. In some embodiments, the backend system may add one or more data elements to the nodes in order to identify the transaction as fraudulent.

The backend data analysis may also be linked to a visually interactive user interface (UI). For example, the UI may include analysis tools that allow a user to see interconnections between an account holder's transactions as well as connections to the overall dataset of all account holder data. In some embodiments, the UI may show how likely any particular transaction is to be fraudulent compared to one or more of the transactions for that user, compared to all transactions of the payment network, compared to a subset of transactions (i.e., transactions for a particular issuer, region, transaction average spending history, or any other data related to a transaction), etc.

Rather than a human identifying the fraudulent transactions, the backend system drastically improves prior fraud detection systems by automatically selecting those transaction nodes that are most similar to the reported fraudulent node using AI/ML methods and perform the refund or cancellation action. Too, the AI/ML methods may be used to identify transaction nodes having other sorts of similarities. For example, the methods may identify transaction nodes corresponding to high-net-worth individuals or other characteristics of the account holders that may be beneficial for the entities involved in the four-party model as described herein.

In one embodiment, a computer-implemented method may identify data nodes using a server and memory hosting an artificial intelligence engine. The method may comprise storing a dataset corresponding to purchase transactions between a plurality of customers to a plurality of merchants, each payment transaction including a merchant identifier. Further, the method may receive, via an input processor coupled to the server and memory, first data corresponding to a first purchase transaction at a merchant. The method may then determine a fraudulent transaction for the first purchase transaction based on an analysis by the artificial intelligence engine of the first data and modify one or more of an authorization process, a clearing process, and a settlement process for the first purchase transaction in response to determining the fraudulent transaction.

In a further embodiment, a system may identify data nodes in a payment transaction process. The system may include a processor and memory hosting an artificial intelligence (AI) engine and a database coupled to the processor and the memory, the database storing a dataset corresponding to payment transactions between a plurality of customers to a plurality of merchants, the plurality of customers corresponding to at least two issuing backs. An input processor coupled to the processor and the memory, the input processor may capture first data corresponding to a purchase transaction at a merchant. A node identification module coupled to an output of the AI engine may identify a fraudulent transaction for the first purchase transaction based on an analysis by the artificial intelligence engine of the first data. The system may then employ a modification module coupled to the processor and memory that modifies one or more of an authorization process, a clearing process, and a settlement process for the first purchase transaction in response to determining the fraudulent transaction.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
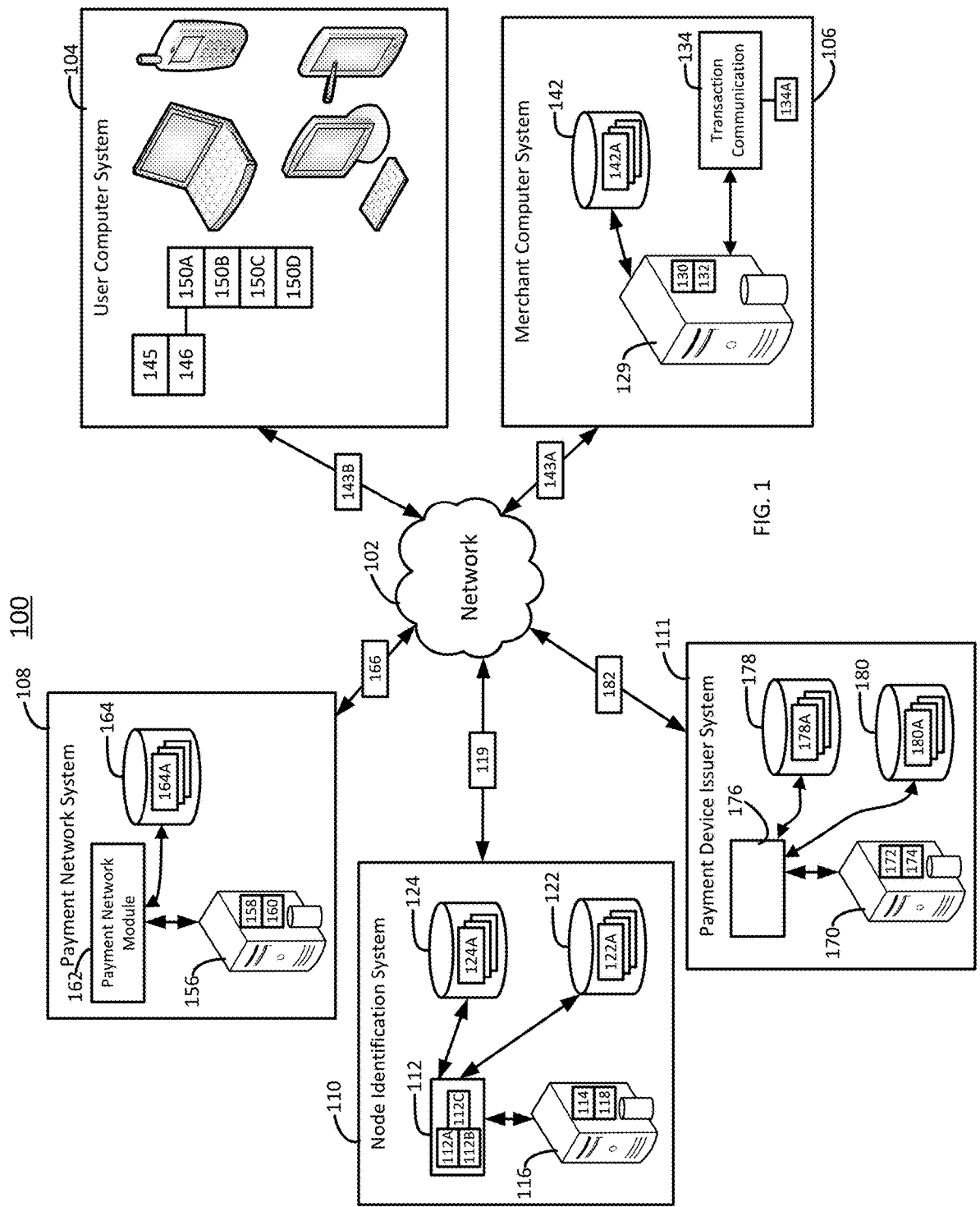
FIG. 1 shows an illustration of an exemplary payment system for intelligently identifying transaction nodes within a network for transactions involving a payment device.

FIG. 1 generally illustrates one embodiment of a payment system 100 for identifying transaction nodes including an intelligently-determined transaction node corresponding to a fraudulent transaction. The system 100 may include a computer network 102 that links one or more systems and computer components. In some embodiments, the system 100 includes a user computer system 104, a merchant computer system 106, a payment network system 108, a node identification system 110, and a payment device issuer system 111.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users and merchants as well as other parties in the "Four Party Model," as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The node identification system 110 may include one or more instruction modules including a node identification module 112 that, generally, may include instructions to cause a processor 114 of a node identification server 116 to functionally communicate with a plurality of other computer-executable steps or sub-modules, e.g., sub-modules 112A, 112B, 112C, and components of the system 100 via the network 102. These modules 112A, 112B, 112C may include instructions that, upon loading into the server memory 118 and execution by one or more computer processors 114, identify one or more transaction nodes 119 including linked data describing payment transactions between various users and/or merchants that may be processed by the payment network system 108. For example, sub-modules may include a first machine learning module 112A, a second machine learning module 112B, a data integration module 112C, etc. A first data repository 122 may store payment network p for all entities of the system 100. In some embodiments, further data repositories may correspond to different types of payment network transaction data 122A or sub-components of the payment network transaction data 122A (e.g., a merchant, an account holder, a transaction region, transaction type, a time of day, a merchant and/or customer type, a payment device type, a transaction amount, cardholder name, cardholder account number, and other payment network account data 164A, etc.). Various other data 124A may be received and/or derived by the node identification system 110 and stored in a second data repository 124 and used by the system 100 as described herein. For example, the second data repository may be used to store electronic wallet transaction details 124A from an electronic wallet system or other method of electronic or computer-based payment.

The merchant computer system 106 may include a computing device such as a merchant server 129 including a processor 130 and memory 132 including components to facilitate transactions with the user computer system 104 and/or a payment device 200 (FIG. 2) via other entities of the system 100. In some embodiments, the memory 132 may include a transaction communication module 134. The transaction communication module 134 may include instructions to send merchant messages 134A to other entities (i.e., 104, 108, 110, 111) of the system 100 to indicate a transaction has been initiated with the user computer system 104 and/or payment device 200 including payment device data and other data as herein described. The merchant computer system 106 may also include a transaction repository 142 and instructions to store payment and other transaction data 142A within the transaction repository 142. In some embodiments, the merchant computer system 106 may send payment data 143A corresponding to a payment device 200 (FIG. 2) to the payment network system 108 or other entities of the system 100, or receive payment data 143B from the user computer system 104 in an electronic wallet-based or other computer-based transaction between the user computer system 104 and the merchant computer system 106.

A user computer system 104 may include a processor 145 and memory 146. The user computing system 104 may include a server, a mobile computing device, a smartphone, a tablet computer, a Wi-Fi-enabled device or other personal computing device capable of wireless or wired communication, a thin client, or other known type of computing device. The memory 146 may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 110.

The payment network system 108 may include a payment server 156 including a processor 158 and memory 160. The memory 160 may include a payment network module 162 including instructions to facilitate payment between parties (e.g., one or more users, merchants, etc.) using the payment system 100. The module 162 may be communicably connected to an account holder data repository 164 including payment network account data 164A. The payment network account data 164A may include any data to facilitate payment and other funds transfers between system entities (i.e., 104, 106, 110, and 111). For example, the payment network account data 164A may include identification data, account history data, payment device data, etc. The module 162 may also include instructions to send payment messages 166 to other entities and components of the system 100 in order to complete transactions between users and/or merchants.

Figure 2A:
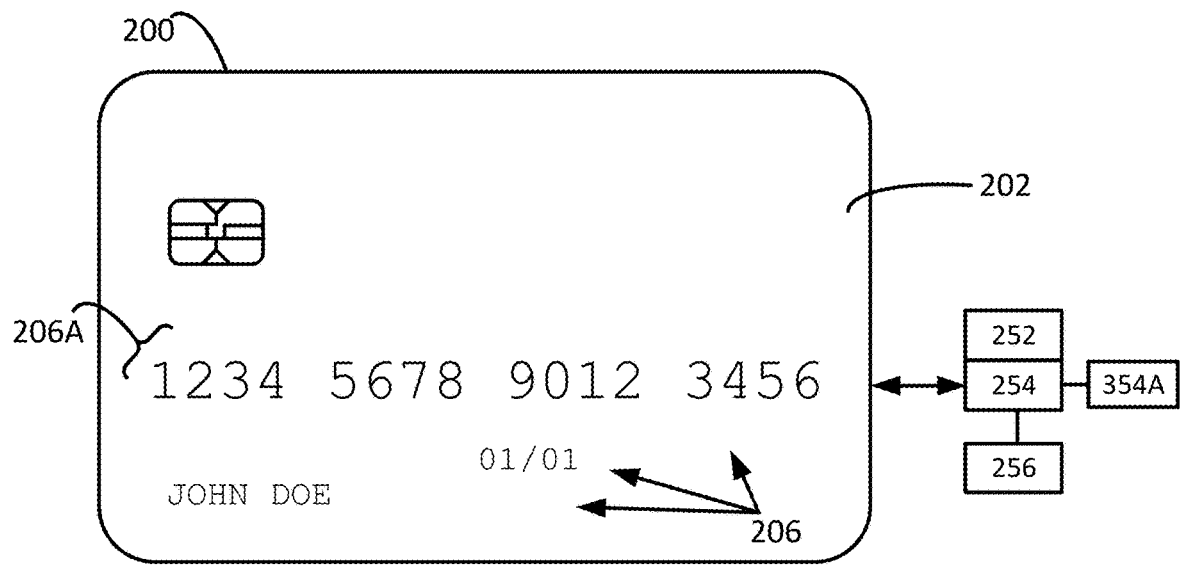
FIG. 2A shows a first view of an exemplary payment device for use with the system of FIG. 1.
Figure 2B:
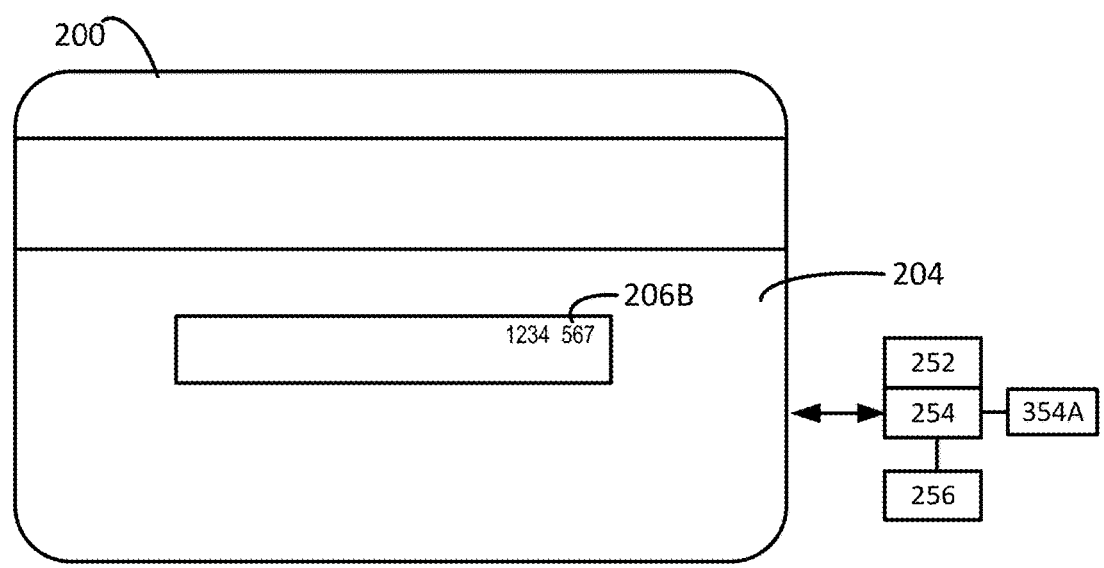
FIG. 2B shows a second view of an exemplary payment device for use with the system of FIG. 1.

With brief reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet where one account from a plurality of accounts previously stored in the wallet is selected and communicated to the system 100 to execute the transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A communication interface 256 may include instructions to facilitate sending payment data 143B, 143A such as a payment payload, a payment token, or other data to identify payment information to one or more components of the system 100 via the network 102.

A payment device issuer system 111 may also include a payment device issuer server 170 including a processor 172 and memory 174. The memory may include a payment device issuer module 176 including instructions to facilitate payment to the merchant computer system 106 using the payment system 100. The module 176 may be communicably connected to an issuer transaction data repository 178 including issuer transaction data 178A. The issuer transaction data 178A may include data to facilitate payment and other funds transfers to/from the merchant from the payment device issuer system 111. For example, the issuer transaction data 178A may include merchant identification data, user account history data, payment device data, etc. The module 176 may also be communicably connected to a cardholder account data repository 180 including cardholder account data 180A. The module 162 may also include instructions to receive payment messages 166 from the payment network system 108 and may include the transaction node 119 in order to complete transactions between users and/or merchants and better manage user and merchant funds account balances to complete transactions.

Figure 3:
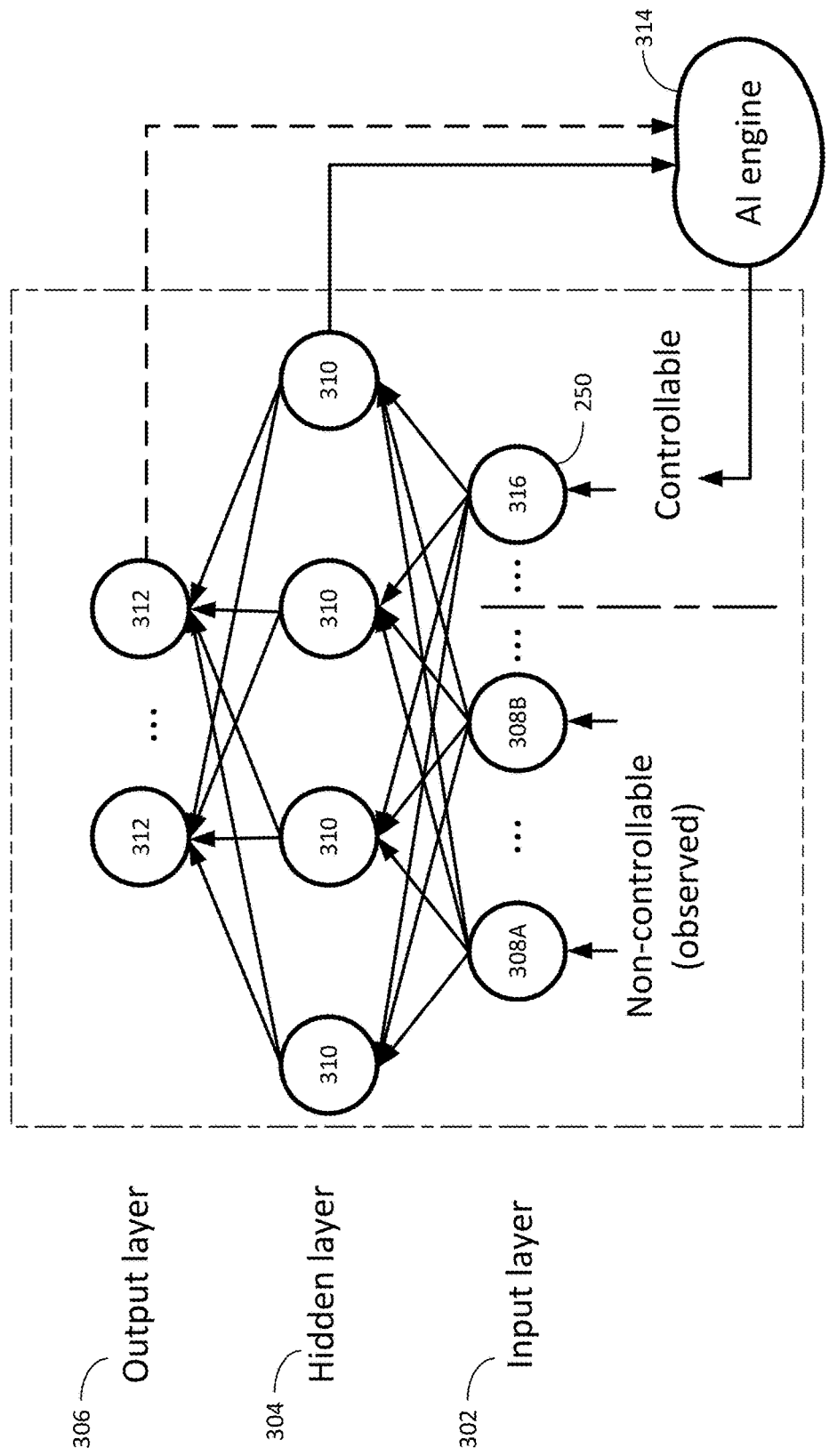
FIG. 3 is an illustration of one embodiment of a machine learning architecture for use with the system of FIG. 1 to identify financial transaction nodes within the network.

With reference to FIG. 3, a machine learning (ML) architecture 300 may be used in a first machine learning module 112A and/or a second machine learning module 112b of the node identification system 110 in accordance with the current disclosure. In some embodiments, the first machine learning module 112A and/or the second machine learning module 112B of the node identification system 110 may include instructions for execution on the processor 114 that implement the ML architecture 300. The ML architecture 300 may include an input layer 302, a hidden layer 304, and an output layer 306. The input layer 302 may include inputs 308A, 308B, etc., coupled to the data integration module 112C and represent those inputs that are observed from actual customer and merchant data in transactions. The hidden layer 304 may include weighted nodes 310 that have been trained for the transactions being observed. Each node 310 of the hidden layer 304 may receive the sum of all inputs 308A, 308B, etc., multiplied by a corresponding weight. The output layer 306 may present various outcomes 312 based on the input values 308A, 308B, etc., and the weighting of the hidden layer 304. Just as a machine learning system for a self-driving car may be trained to determine hazard avoidance actions based on received visual input, the machine learning architecture 300 may be trained to analyze a likely outcome for a given set of inputs based on thousands or even millions of observations of previous customer/merchant transactions. For example, the architecture 300 may be trained to identify transactions that are most likely fraudulent, to identify accounts that are associated with high-net-worth payment device users, etc.

During training of the machine learning architecture 300, a dataset of inputs may be applied and the weights of the hidden layer 310 may be adjusted for the known outcome associated with that dataset. As more datasets are applied, the weighting accuracy may improve so that the outcome prediction is constantly refined to a more accurate result. In this case, the first data repository 122 including payment network transaction data 122A for entities of the system 100 may provide datasets for initial training and ongoing refining of the machine learning architecture 300.

Additional training of the machine learning architecture 300 may include the an artificial intelligence engine (AI engine) 314 providing additional values to one or more controllable inputs 316 so that outcomes may be observed for particular changes to the payment network transaction data 122A or other data 124A. The values selected may represent different data types such as selected cryptographic methods applied to the payment network account data 164A, merchant messages 134A, sent payment data 143A, received payment data 143B, and other alternative data presented at various points in the transaction process and may be generated at random or by a pseudo-random process. By adding controlled variables to the transaction process, over time, the impact may be measured and fed back into the machine learning architecture 300 weighting to allow capture of an impact on a proposed change to the process in order to optimize the determination of the fraudulent transaction node 119. Over time, the impact of various different data at different points in the transaction cycle may be used to predict an outcome for a given set of observed values at the inputs layer 302.

After training of the machine learning architecture 300 is completed, data from the hidden layer may be fed to the artificial intelligence engine 314 to generate values for controllable input(s) 316 to optimize the transaction node 119 or even increase the automated identification of fraudulent or other types of transactions and predictive uses of the payment device. Similarly, data from the output layer may be fed back into the artificial intelligence engine 314 so that the artificial intelligence engine 314 may, in some embodiments, iterate with different data to determine via the trained machine learning architecture 300, whether a transaction node 119 is fraudulent, whether cardholder account data 180A is associated with a high-net-worth cardholder, and other determinations.

Figure 4:
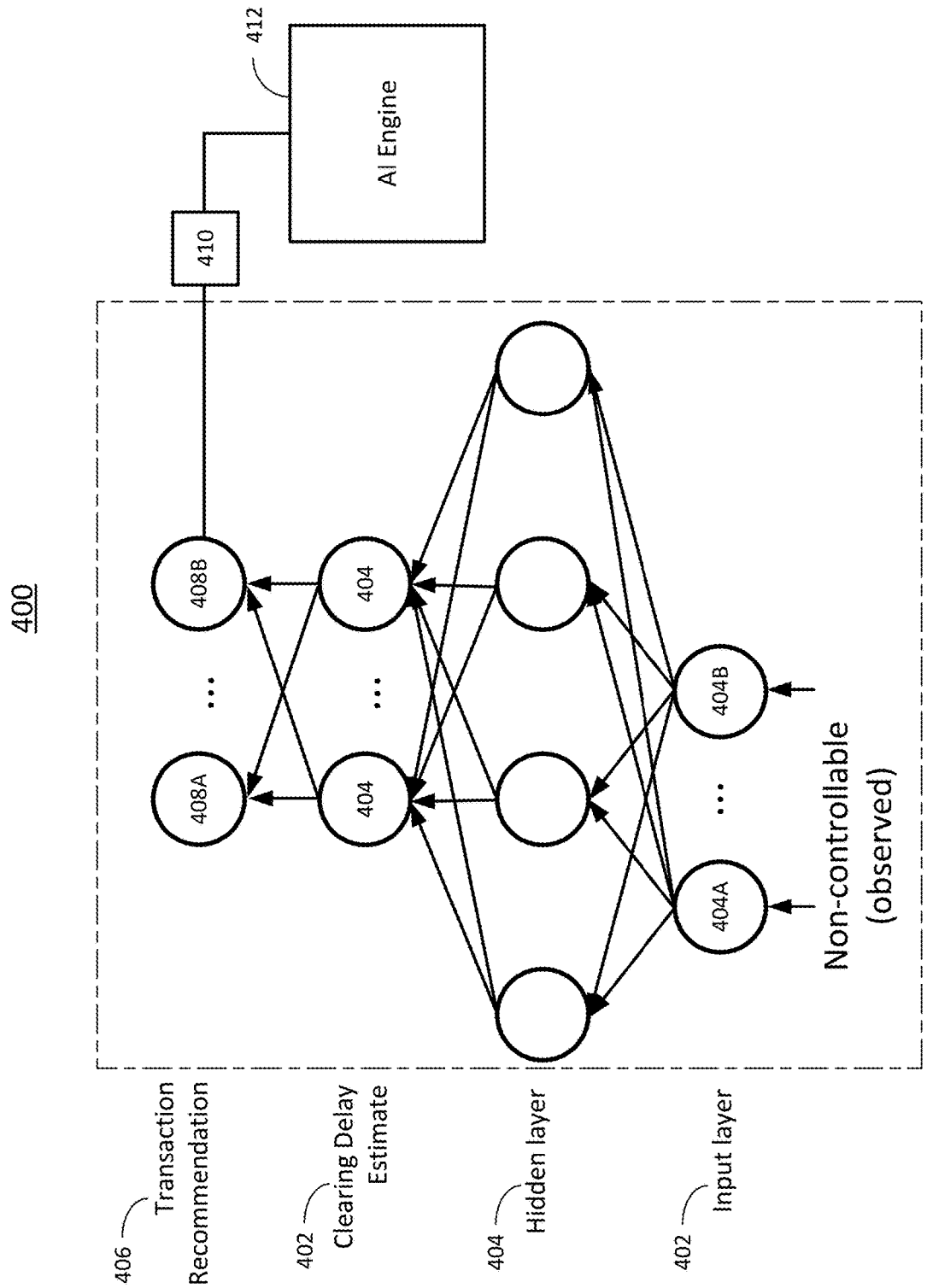
FIG. 4 is an illustration of another embodiment of a machine learning architecture for use with the system of FIG. 1 to identify financial transaction nodes within the network.

With reference to FIG. 4, in other embodiments, the machine learning architecture 300 and artificial intelligence engine 314 may include a second instance of a machine learning architecture 400 and/or an additional node layer may be used. In some embodiments, a fraudulent transaction node identification layer 402 may determine a fraudulent transaction node 404 from observed inputs 404A, 404B. A transaction identification recommendation layer 406 with outputs 408A, 408B, etc., may be used to generate transaction identification recommendations 410 to an artificial intelligence engine 412, which in turn, may modify one or more of the payment network account data 164A, merchant messages 134A, sent payment data 143A, received payment data 143B, and other alternative data and the cryptographic methods used when communicating this data via an appropriate SDK.

Figure 5:
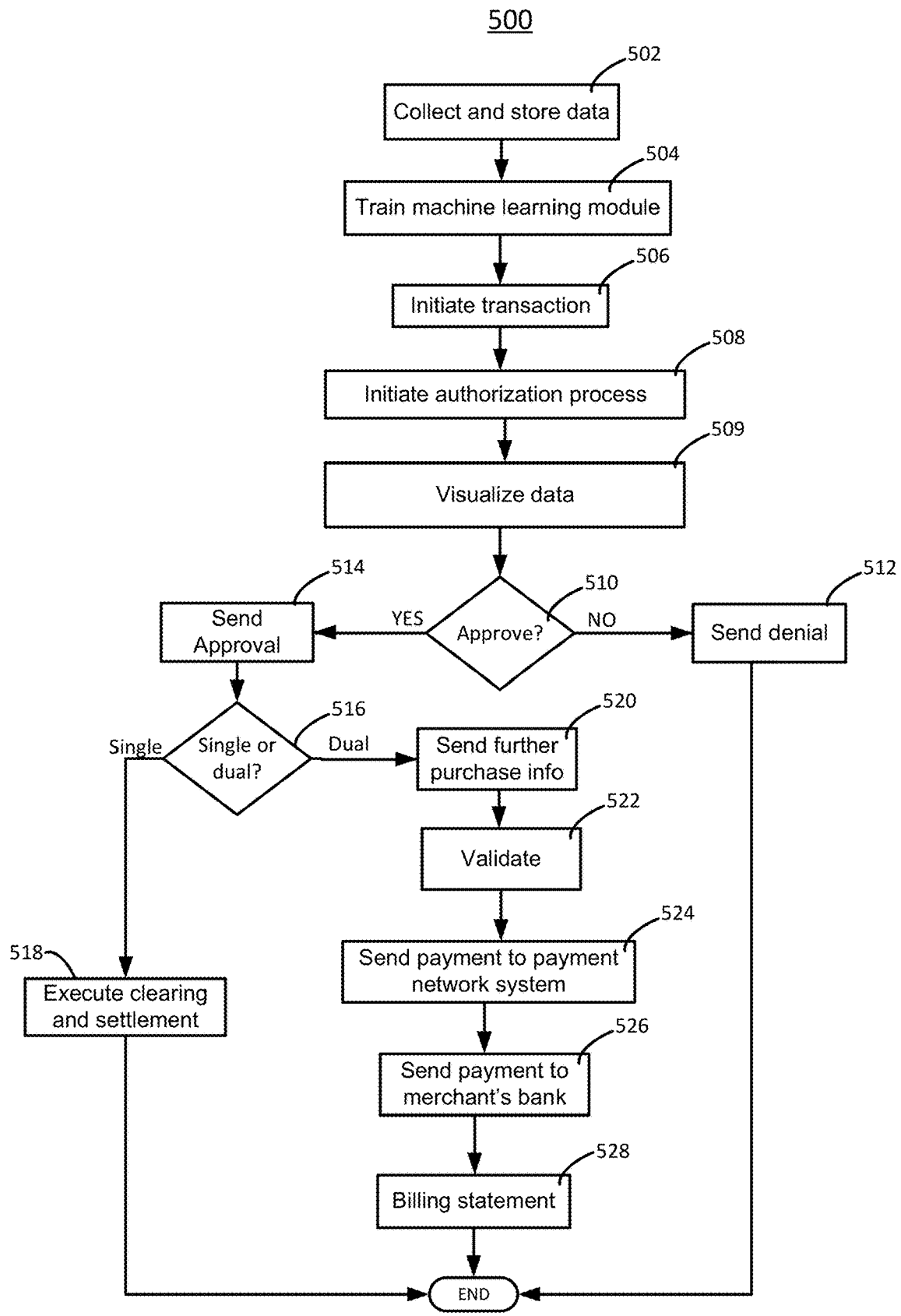
FIG. 5 is a flowchart of a method for determining related network nodes and performing other actions with those nodes within the system of FIG. 1.

FIG. 5 is a flowchart of a method 500 for determining a fraudulent transaction node 119 or other transaction or account characteristics within the system 100. Each step of the method 500 may be performed on a server or other computing device which may be physically configured to execute the different aspects of the method. Each step of the method 500 is one or more computer-executable instructions (e.g., modules, blocks, stand-alone instructions, etc.) performed on a processor (e.g., 114, 130, 145, 158, 172, 902, etc.) of a server or other computing device (e.g., a payment system 100, a user computer system 104, a merchant computer system 106, a payment network system 108, a node identification system 110, a payment device issuer system 111, or other computer system) which may be physically configured to execute the different aspects of the method. Each step may include execution of any of the instructions as described in relation to the systems or other component that is internal or external to the systems. While the below blocks are presented as an ordered set, the various steps described may be executed in any particular order to complete the methods described herein.

At block 502, the system 100 may cause a processor to execute instructions stored in a computer memory to collect and store a dataset (e.g., payment network transaction data 122A, wallet transaction details 124A, merchant messages 134A, issuer transaction data 178A, etc.) during communications to complete payment transactions among the entities (i.e., the user, merchant, payment network system, issuer, etc.) of the system 100. The dataset may include payment network transaction data 122A for multiple individual customer interactions and transactions with multiple merchants across the entire payment network. The payment network transaction data 122A may include type and amount of a transaction, a region of the card holder and/or merchant, a type of merchant and cardholder, a transaction type, etc., among others. The payment network transaction data 122A may also include outcome data such as items purchased, purchase volume, purchase value, time between transactions, etc. The payment network transaction data 122A may be stored, for example, in the data repository 122 at block 502. In an embodiment, the payment network transaction data 122A may be used by the AI engine 314 to determine or infer a fraudulent transaction node 119.

At block 503, the system 100 may cause a processor to execute instructions stored in a computer memory to flag one or more nodes of the payment network transaction data 122A as fraudulent. In some embodiments, the payment device issuer system 111 may receive an indication that one or more of the transactions is fraudulent. For example, the system 111 may receive a message or other data originating tome a user computer system 104 or any other entity that one or more of the payment network transaction data 122A is fraudulent. The processor 172 of the payment device issuer server 170 may execute an instruction stored in the memory 174 to edit or add data to one or more of the payment network transaction data 122A to indicate the transaction is fraudulent.

At block 504, the system 100 may cause a processor to execute instructions stored in a computer memory to use the payment network transaction data 122A that has been flagged as fraudulent from block 503 to train a first or second machine learning (ML) module 112A, 112B to determine a fraudulent transaction node 119. The training of the ML modules 112A, 112B may occur in two steps. First, "natural" data 122A may be collected from customer/merchant transactions. Second, "test" data 122A may be collected from transaction sessions for which some data may be intentionally altered to optimize determining a fraudulent transaction node 119. In some embodiments, data that may be altered to train the system to identify a fraudulent transaction may include a length of time the account has been established, a size of the transaction to include numerous items purchased, a transaction may be modified to include several of the same item, a transaction that includes "rush" or express shipping, an international shipping address, altering the account number to be similar to other account numbers, shipping items from multiple transactions across multiple accounts to a single address, a single account used to ship to many addresses, multiple transactions with a single account over a short period of time, a single IP address for transactions involving many accounts, orders using disposable email addresses, etc. one or more of these characteristics of a transaction may be modified and tested as controllable inputs 316. The test datasets may contain randomly generated changes, targeted changes based on suspected effects, or may be a combination of these or others.

At block 506, the system 100 may cause a processor to execute instructions stored in a computer memory to may encrypt and communicate payment network transaction data 122A and other data 124A corresponding to a payment device 200 used in a transaction with a customer from the merchant computer system 106 to the payment device issuer system 111 and initiate a customer/merchant transaction. In some embodiments, the transaction communication module 134 may execute an instruction to send the payment network transaction data 122A and other data 124A via a merchant message 134 to one or more entities of the system 100. As described above, payment network transaction data 122A may include a transaction region, transaction type, a time of day, a merchant and/or customer type, a payment device type, a number of items in the transaction, a type of each item in the transaction, a shipping method, a shipping address, a timing between past transactions on the account, an IP address for an online transaction, an email address, a transaction amount, cardholder name, account number, and payment network account data 164A stored on the payment device, etc.

At block 508, system 100 may cause a processor to execute instructions stored in a computer memory to initiate an authorization process in response to receiving the payment network transaction data 122A and other data 124A. Typically, the merchant computer system 106 may pass the payment network transaction data 122A and other data 124A to the payment network system 108. The payment network system 108 may then check the encryption of the received payment network transaction data 122A and other data 124A, determine the payment network account data 164A corresponding to the received data, and send it on to the cardholder's bank (i.e., the payment device issuer system 111) for approval.

At block 509, the system 100 may cause a processor to execute instructions stored in a computer memory to create a visualization of the payment network transaction data 122A. In some embodiments, system 100 may mash the payment network transaction data 122A and match various pieces of the data to users, merchants, and other identifiers. In some embodiments, matching the payment network transaction data 122A to particular users and merchants may also identify potential combinations or analysis via reports or applications which may include potential operational or strategic research items such as fraud detection, as described herein. Visualizations and reports may be dynamic. For example, a Common Point of Purchase analysis may include determining that a large number of transactions originate from a common merchant. Rather than using separate reports for merchant locations and card acceptance actions and combining these reports, the system 100 may execute instructions to convert the reports for use with the AI/ML models described herein. Reports may be auto-generated along with summaries and rich graphics to indicate key performance indicators within the payment network transaction data 122A.

At block 510, system 100 may cause a processor to execute instructions stored in a computer memory to pass the payment network transaction data 122A and other data 124A from the payment network system 108 to the node identification system 110 to determine characteristics of the node for approval or denial of the transaction. In some embodiments, the node identification system may execute instructions to determine whether it is a fraudulent transaction node 119 using the visualizations of block 509. If the node identification system 110 determines payment network transaction data 122A and other data 124A is fraudulent, then, at block 512, the method may send a denial message to the merchant computer system 106, and the method 500 may end. In some embodiments, sending the denial message at block 512 includes modifying one or more of an authorization process, a clearing process, and a settlement process for the fraudulent transaction.

If the node identification system 110 determines payment network transaction data 122A and other data 124A is not fraudulent, then, at block 514, the method 500 may proceed.

The transaction node 119 may then be passed to other entities of the system 100. For example, the payment network system 108 may incorporate the transaction node 119 into communication regarding the transaction with one or more of the payment device issuer system 111, the merchant computer system 106, etc. In further embodiments, the transaction node 119 may be sent directly from the node identification system 110 to other entities of the system 100.

At block 514, the system 100 may cause a processor to execute instructions stored in a computer memory to approve the transaction and send a corresponding approval message to one or more entities of the system 100.

At block 516, if the system 100 operates as a single-message system, the system 100 may cause a processor to execute instructions stored in a computer memory to proceed to block 518 to execute clearing and settlement of the transaction and end.

At block 520, if the system 100 operates as a dual-message system, the system 100 may cause a processor to execute instructions stored in a computer memory to send further purchase information to the payment network system 108 from the merchant's bank. At block 522, system 100 may cause a processor of the payment network system 108 to execute instructions stored in a computer memory to validate the received further purchase information and send it to the payment device issuer system 111 to prepare the cardholder's statement. The payment network system 108 may also provide comprehensive reconciliation to both the merchant's bank and to the payment device issuer system 111. At block 524, the system 100 may cause a processor to execute instructions stored in a computer memory of the payment device issuer module 176 to send payment to the payment network system 108 or an agent of the system 108. At block 526, the system 100 may cause a processor of the payment network system 108 to execute instructions stored in a computer memory to send payment to the merchant's bank for reconciliation with the merchant computer system 106. At block 528, system 100 may cause a processor to execute instructions of the payment device issuer module 176 to send a billing statement to the user computer system 104 and end.

Figure 6:
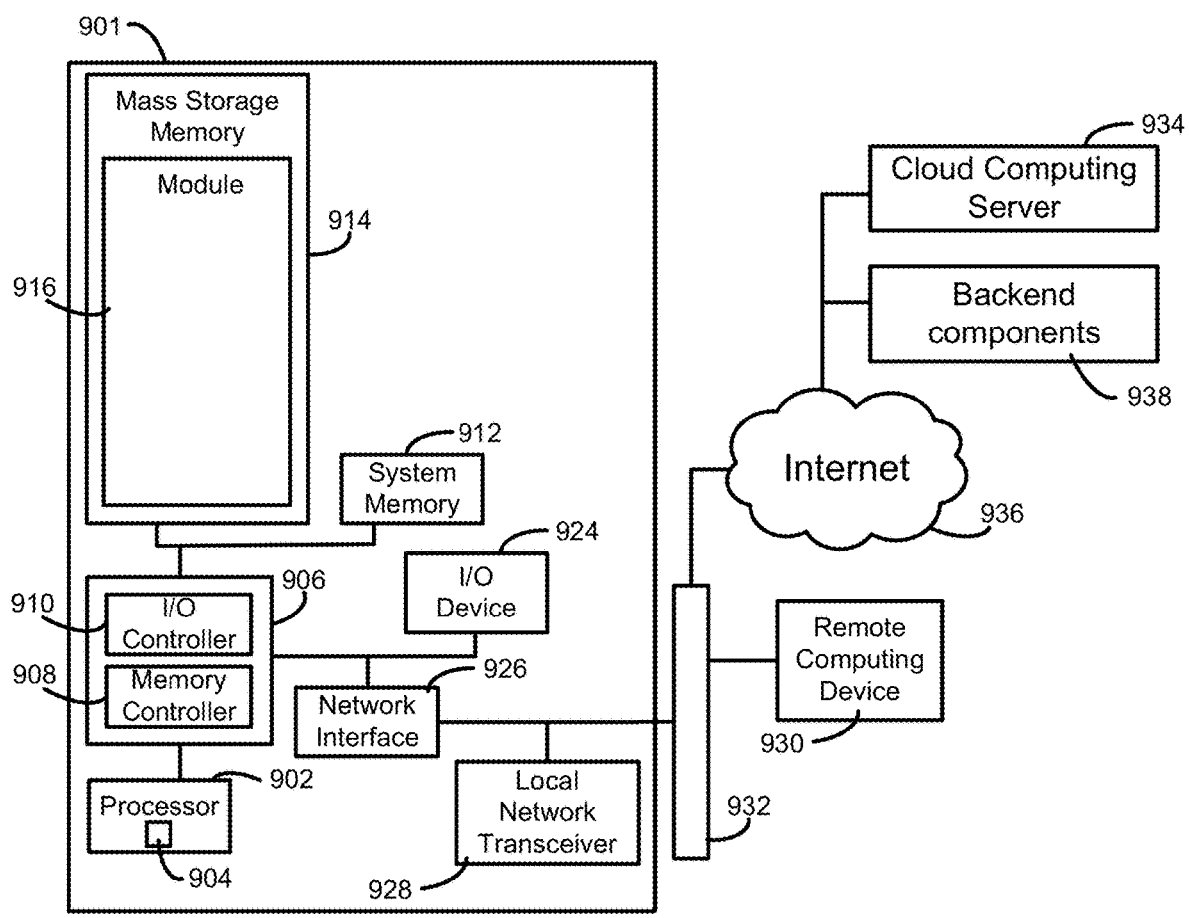
FIG. 6 shows an exemplary computing device that may be physically configured to execute the methods and include the various components described herein.

FIG. 6 is a high-level block diagram of an example computing environment 900 for the system 100 and methods (e.g., method 500) as described herein. The computing device 900 may include a server (e.g., the payment server 156, merchant server 129, payment server 156, node identification server 116, mobile computing device (e.g., user computing system 104), a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment server 156 may receive a large amount of data in a short period of time meaning the payment server may contain a special, high speed input output circuit to handle the large amount of data. Similarly, the node identification server 116 may execute processor intensive machine learning algorithm and thus the node identification server 116 may have increased processing power that is specially adapted to quickly execute the machine learning algorithms. In yet another example, the merchant server 129 may be under less computing strain than the node identification server 116 and may have less processing power than the node identification server.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of identifying and visually representing data nodes that represent purchase transactions on a graphical user interface (GUI) using a server and memory hosting an artificial intelligence engine, the method comprising:
   storing a dataset including payment network account data corresponding to past purchase transactions between a plurality of customers and a plurality of merchants, each payment transaction including a user identifier of a plurality of user identifiers and a merchant identifier of a plurality of merchant identifiers;
   organizing the dataset as a visual representation of the past purchase transactions corresponding to one of the plurality of user identifiers in a graph, wherein the visual representation represents the purchase transactions corresponding to the one of the plurality of user identifiers as a plurality of data nodes of the graph within the GUI based on common data shared between the data nodes;
   receiving, via the input processor coupled to the server and memory, an indication that a first purchase transaction of the dataset is fraudulent;
   iteratively adjusting one or more weights of a hidden layer of the artificial intelligence engine until the artificial intelligence engine identifies the first purchase transaction as fraudulent;
   determining a fraudulent transaction for a second purchase transaction based on an analysis by the artificial intelligence engine of the dataset using the adjusted one or more weights of the hidden layer; and
   automatically modify a first node corresponding to the first purchase transaction and a second node corresponding to the second purchase transaction of the graph within the GUI based on the analysis by the artificial intelligence engine of the dataset using the adjusted one or more weights of the hidden layer.

2. The method of claim 1, wherein determining the fraudulent transaction for the second purchase transaction based on the analysis by the artificial intelligence engine includes providing the dataset to a machine learning architecture that correlates the past purchase transactions to a known outcome.

3. The method of claim 1, further comprising modifying an authorization process for the second purchase transaction in response to determining the fraudulent transaction, wherein the authorization process includes aggregating a plurality of determined fraudulent transactions over a period of time and determining an expected payable amount for the period of time based on the aggregated plurality of determined fraudulent transactions.

4. The method of claim 3, wherein modifying the authorization process for the second purchase transaction in response to determining the fraudulent transaction includes approving or denying the second purchase transaction when at least some second data corresponding to the second purchase transaction matches at least some first data corresponding to the first purchase transaction.

5. The method of claim 4, wherein the analysis by the artificial intelligence engine of the dataset determines when the at least some second data corresponding to the second purchase transaction matches the at least some first data corresponding to the first purchase transaction.

6. The method of claim 5, further comprising adjusting an amount forecasted for dispersal in response to analysis by the artificial intelligence engine of the dataset.

7. The method of claim 6, wherein modifying the authorization process for the second purchase transaction in response to determining the fraudulent transaction includes sending a denial message in response to the at least some second data corresponding to the second purchase transaction matching the at least some first data corresponding to the first purchase transaction.

8. The method of claim 7, wherein modifying the authorization process for the second purchase transaction in response to determining the fraudulent transaction sending an approval message in response to the artificial intelligence engine determining that the first data includes a legitimate purchase transaction.

9. The method of claim 1, wherein the dataset includes, for each purchase transaction, one or more of a transaction region, a transaction type, a time of day, a merchant type, a customer type, a payment device type, a transaction amount, a cardholder name, and a cardholder account number.

10. A system for identifying and visualizing data nodes that represent purchase transactions on a graphical user interface (GUI) in a payment transaction process comprising:
   a processor and memory that hosts an artificial intelligence (AI) engine;
   a database coupled to the processor and the memory that stores a dataset including payment network account data corresponding to past purchase transactions between a plurality of customers and a plurality of merchants, each payment transaction including a user identifier of a plurality of user identifiers and a merchant identifier of a plurality of merchant identifiers;
   an input processor coupled to the processor and the memory that captures first data corresponding to a first purchase transaction of the dataset and receives an indication that the first purchase transaction is fraudulent;
   a visualization module coupled to the processor and memory that organizes the dataset as a visual representation of the past purchase transactions corresponding to one of the plurality of user identifiers in a graph and modifies the first data corresponding to the first purchase transaction based on the indication that the first purchase transaction is fraudulent, wherein the visual representation represents the purchase transactions corresponding to the one of the plurality of user identifiers as a plurality of data nodes of the graph within the GUI based on common data shared between the data nodes;
   a training module coupled to the AI engine that iteratively adjusts one or more weights of a hidden layer of the artificial intelligence engine until the artificial intelligence engine identifies the first purchase transaction as fraudulent; and
   a node identification module coupled to an output of the AI engine that determines a fraudulent transaction for a second purchase transaction based on an analysis by the artificial intelligence engine of the dataset using the adjusted one or more weights of the hidden layer;

wherein the visualization module further automatically modifies a first node corresponding to the first purchase transaction and a second node corresponding to the second purchase transaction of the graph within the GUI based on the analysis by the artificial intelligence engine of the dataset using the adjusted one or more weights of the hidden layer.

11. The system of claim 10, wherein the node identification module further provides the dataset to a machine learning architecture that correlates the past purchase transactions to a known outcome.

12. The system of claim 10, further comprising a transaction communication module coupled to the processor and memory that encrypts the first data using a first encryption method before the input processor captures the first data.

13. The system of claim 12, wherein the modification module causes the transaction communication module to:
aggregate a plurality of determined fraudulent transactions over a period of time, and
determine an expected payable amount for the period of time based on the aggregated plurality of determined fraudulent transactions.

14. The system of claim 10, wherein the modification module further approves or denies the first purchase transaction and the second purchase transaction when second data corresponding to the second purchase transaction matches the first data.

15. The system of claim 14, wherein the analysis by the artificial intelligence engine of the first data determines when the second purchase transaction matches the first data.

16. The system of claim 15, wherein the modification module further adjusts an amount forecasted for dispersal in response to analysis by the artificial intelligence engine of the second data corresponding to the second purchase transaction matching at least a portion of the first data.

17. The system of claim 16, wherein the modification engine further sends a denial message in response to the second data corresponding to the second purchase transaction matching at least a portion of the first data.

18. The system of claim 16, wherein the modification engine further sends an approval message in response to the artificial intelligence engine determining that the first data includes a legitimate purchase transaction.

19. The system of claim 16, wherein the dataset includes, for each purchase transaction, one or more of a transaction region, a transaction type, a time of day, a merchant type, a customer type, a payment device type, a transaction amount, a cardholder name, and a cardholder account number.

* * * * *